United States Patent [19]

Read et al.

[11] Patent Number: 5,278,355
[45] Date of Patent: Jan. 11, 1994

[54] ENVIRONMENTAL SEALING

[75] Inventors: Michael Read, Los Altos, Calif.; Robert Vanhentenrijk, Winksele Herent, Belgium

[73] Assignee: Raychem Limited, United Kingdom

[21] Appl. No.: 820,598

[22] PCT Filed: Jul. 17, 1990

[86] PCT No.: PCT/GB90/01098
§ 371 Date: Jan. 21, 1992
§ 102(e) Date: Jan. 21, 1992

[87] PCT Pub. No.: WO91/01581
PCT Pub. Date: Feb. 7, 1991

[30] Foreign Application Priority Data

Jul. 20, 1989 [GB] United Kingdom ............... 8916590

[51] Int. Cl.[5] ............................................. H02G 15/08
[52] U.S. Cl. ............................... 174/88 R; 174/72 R; 174/77 R; 174/DIG. 8
[58] Field of Search ............................ 174/88; 156/49

[56] References Cited

U.S. PATENT DOCUMENTS

| | | | |
|---|---|---|---|
| 4,400,579 | 8/1983 | Nolf | 174/DIG. 8 |
| 4,680,065 | 7/1987 | Vansant et al. | 174/DIG. 8 |
| 4,689,474 | 8/1987 | Overbergh et al. | 174/DIG. 8 |
| 4,734,543 | 3/1988 | Nolf | 174/88 R |
| 4,920,236 | 4/1990 | Makiyo et al. | 174/77 R |
| 5,043,537 | 8/1991 | Wade | 174/84 R |

FOREIGN PATENT DOCUMENTS

| | | | |
|---|---|---|---|
| 0120603 | 10/1984 | European Pat. Off. | H01R 4/70 |
| 2413623 | 10/1975 | Fed. Rep. of Germany | H02G 15/23 |
| 3243446 | 5/1984 | Fed. Rep. of Germany | H02G 15/01 |
| 33416618 | 5/1985 | Fed. Rep. of Germany | H33G 15/18 |

*Primary Examiner*—Morris H. Nimmo
*Attorney, Agent, or Firm*—Herbert G. Burkard; A. Stephen Zavell

[57] ABSTRACT

A method of forming a branch-off seal between a heat-shrinkable sleeve and at least two spaced-apart elongate substrates, which comprises the steps of:

(a) positioning the substrates within the heat-shrinkable sleeve;
(b) positioning between the substrates and within the sleeve at an open end thereof a plug having a larger cross-sectional size at a first position away from said open end and a smaller cross-sectional size at a second position towards said open end;
(c) positioning a heat-activatable sealing material at the first position;
(d) shrinkable conduits in the sleeve by positioning one or more clips at the open end of the sleeve such that the substrates and the plug are in respective conduits; and
(e) while the clip remains on the sleeve, applying heat so as to affect shrinkage of the sleeve to activate the sealant, and form the desired seal.

13 Claims, 2 Drawing Sheets

ENVIRONMENTAL SEALING

This invention relates to environmental sealing, particularly by means of a heat-shrinkable sleeve of substrates, such as telecommunications or other cables, particularly at cable splices or other regions where cables run close to one another, especially spaced apart by a fixed amount.

Heat-shrinkable articles are now widely used in many areas where environmental sealing, for example, insulation, bonding or encapsulation, is required. Usually these articles dimensionally-recover on heating to a shape from which they have previously been deformed, but the term "heat-shrinkable" as used herein also includes an article which, on heating, adopts a new configuration, even if it has not previously been deformed.

In their most common form, such articles comprise heat-shrinkable sleeves made from polymeric material exhibiting the property of elastic or plastic memory as desired, for example, in U.S. Pat. Nos. 2,027,962, 3,086,242 and 3,957,372.

Heat-shrinkable sleeves find many applications, especially in the connection and termination of wires, cables and pipes. However, there are applications where it is desirable to provide a sealing member for elongate substrates such as cables or pipes or other supply lines whose ends are not accessible. For such applications so-called "wrap-around" sleeves have been developed. Basically, they are heat-shrinkable sheets which can be wrapped around a substrate to form a generally tubular shape and which, in general, are provided with fastening means for holding them in the wrapped-around configuration during heat-shrinkage. Examples of such sleeves are disclosed in GB1155470.

Heat-shrinkable sleeves have been successfully employed in many fields, but problems may arise when two or more substrates have to be sealed at one position. This problem, which is known as "branch-off", may occur, for example, at the outlet of a heat-shrinkable part. Amongst fields in which this problem is typically encountered there may especially be mentioned the outlets of the splice cases described and claimed in GB1431167 (Raychem), the disclosure of which is incorporated herein by reference.

One effective solution for tubular sleeves has been to use moulded heat-shrinkable parts provided with preformed outlets for the individual substrates. However, in general, such parts have to be made to suit a particular application, and many different such parts will therefore be required to cover all the applications likely to be encountered.

A solution of major commercial importance to this problem is disclosed and claimed in U.S. Pat. No. 4,648,924 (Raychem), the disclosure of which is incorporated herein by reference. In that patent, a method of forming a branch-off seal between a heat-shrinkable sleeve and at least two substrates, comprises the steps of:

(a) positioning the substrates within a heat-shrinkable sleeve;

(b) forming at least two heat-shrinkable terminal conduits by positioning a clip having at least two elongate legs over the outer surface of the heat-shrinkable sleeve at an open end thereof, wherein at least two of said legs are positioned externally of the sleeve and the substrates are within the terminal conduits; and (c) while the clip remains on the outer surface of the heat-shrinkable sleeve, applying heat so as to effect shrinkage of the sleeve and to form the desired seal.

U.S. Pat. No. 4,400,579 (Raychem) discloses and claims an assembly comprising a heat-shrinkable sleeve capable of being positioned around at least first and second elongate substrates, and a clip formed as a trident, the outer legs of which are capable of being positioned over the outer surface of the sleeve at the end thereof with the central leg of the trident (which may taper towards its proximal end and may be coated with an adhesive) inside the sleeve so as to form, and maintain during subsequent heat shrinkage of the sleeve, at least two terminal conduits respectively capable of receiving the first and second substrates.

Whilst the clips disclosed in these patents are outstandingly successful for most uses, some difficulties may be noticed under unfavourable conditions, for example, where the distance between the substrates is significant and cannot be altered. For example, in some countries it is common to enclose a telephone cable splice in a lead box which is provided with spaced apart lead conduits for the incoming and outgoing cables. The cables may vary in diameter between, say, 18 and 95 mm and the distance between the conduits may be fixed at, say, 30 mm. In such a situation gaps would remain under the sleeve even if several clips were used.

An attempt to solve this problem is related in GB 2019114 (Raychem) which discloses and claims a kit of parts comprising a heat-shrinkable sleeve and at least one fork member for use in forming a seal between the sleeve and at least two substrates by a method which comprises threading an end portion of the sleeve, which is positioned between the two substrates about the prongs of the fork member so that, on recovery, the heat shrinkable material tightens within the prongs of said fork member and at least two of the prongs of the fork member abut the outer surfaces of the sleeve surrounding the substrate so as to retain the fork member firmly in position, the fork member being retained with lateral ears that in use may rest against substrates where they pass out of the sleeve.

A tubular clip having longitudinally-extending, circumferentially-separated slits is disclosed in EP 0094793 (Raychem). The intention there is to hold together two thicknesses of a heat-shrinkable sleeve between two spaced apart substrates.

Reference may also be made to EP 0050995 (Raychem) which discloses the use of two or more clips (one of which may be a heat-pipe) to seal a heat-shrinkable sleeve around three or more cables, and also to DE 2413623 (Rose) and DE 3243446 (Siemens) which disclose the formation of conduits by positioning of cylindrical plugs within heat-shrinkable sleeves.

Whilst some success may be achieved with the designs disclosed in GB 2019114 and EP 0094793 problems have been experienced in fully sealing the substrates at positions far inside the sleeve, at least under unfavourable conditions.

We have now discovered that such problems may be solved the use of a plug member in addition to a branch-off clip.

Thus, the invention provides a method of forming a branch-off seal between a heat-shrinkable sleeve and at least two spaced-apart elongate substrates, which comprises the steps of:

(a) positioning the substrates within the heat-shrinkable sleeve;

(b) positioning between the substrates and within the sleeve at an open end thereof, a plug having a larger cross-sectional size at a first position away from said open end and a smaller cross-sectional size at a second position towards said open end;

(c) positioning a heat activatable sealing material at the first position;

(d) forming and/or maintaining at least three heat-shrinkable conduits (preferably terminal conduits, although a middle conduit need not extend to the extreme end of the sleeve) in the sleeve by positioning one or more clips at the open end of the sleeve such that the substrates and the plug are in respective conduits; and (e) while the clip remains on the sleeve applying heat so as to affect shrinkage of the sleeve, to activate the sealant, and form the desired seal.

The above steps may be carried out in any order, and the following order is preferred. A sleeve is first installed around the substrates, preferably by wrapping it around them and securing it in the wrapped-around configuration. Next, the plug and sealant are placed within the sleeve between the substrates, placing of plug and sealant preferably occurring simultaneously since the plug preferably includes the sealant especially as a tape wrap around a support member. Then, preferably two clips are installed, respective clips being positioned between the plug and a respective substrate. Heat is then applied, for example, by an open-flame torch or a hot-air gun or by electrical heating means that may be part of the sleeve, to cause the sleeve to shrink and the sealant to become heat-activated, preferably by melting or otherwise softening. In a variation of this sequence, the plug and sealant may be positioned between the substrates and held in place by wedging or tape wrapping etc before positioning of the sleeve.

The clips may be two-legged clips of simple U-shape, each leg of the U being positioned externally of the sleeve to bring circumfrentially-spaced portions of the sleeve together and/or to maintain such portions together (for example, where the sleeve is pre-shaped) during heat-shrinkage, and optionally also during service life of the product. Preferred clips, however, comprise three legs, preferably lying in a common plane, a middle leg of the clip comprising a sealing material, preferably a hot-melt adhesive, and more particularly comprising a heat-conductive support coated with a sealing material. Such a clip is positioned with its outer legs externally of the sleeve and its middle leg internally of the sleeve between the substrates. In this way sealing material is delivered by the clip to a space that may otherwise remain between the substrates and the sleeve. Where the middle leg comprises a heat-conductive support and a sealing material, heat may be conducted during installation from a torch etc via the outer legs to the middle leg to activate the sealing material thereon.

The plug may have any suitable shape so long as one end has a larger cross-sectional size than the other end, these ends being defined in the method of the invention in terms of their position relative to the sleeve when the plug is installed in the sleeve. We prefer, however that the plug be elongate and positioned substantially parallel to the substrates. Preferably the plug (or a support member thereof) is of substantially uniform cross-sectional shape along its length, and also is preferably of substantially circular or substantially oval cross-section. In a particularly preferred embodiment the plug (or a support member thereof) comprises first and second substantially cylindrical portions interconnected by a substantially frustoconical portion, the first portion being of larger cross-sectional size than the second portion. We prefer that the second portion is from 0.75-2.0, preferably 1.0-1.75 times the length of the first portion, and that the frusto-conical portion (where present) is from 0.2-1.0, preferably 0.2-0.5 times the length of the first portion. The first portion preferably has a cross-sectional size in the direction from one substrate to the other of from 0.5-0.95, more preferably 0.6-0.9 times the separation between the substrates. The plug may be built up in length and/or cross-section in a modular fashion to adapt it to different sizes of substrate. For example, an adaptor of annular shape, comprising for example a sealing material, may be installed around the first portion to increase its cross-sectional size.

Where a cable splice case is to be sealed, the plug preferably has a length such that the first portion touches or almost touches (say, is within 2 or 3 cms) of the splice or splice case that joins or seals the two cables and the second portion extends to a position from 3 cms short of to 3 cms proud of the end of the sleeve.

The heat-shrinkable sleeve may, for example, comprise a uniform extruded polymeric material or a composite material, preferably one comprising a fibre-reinforced polymeric material. The fibres may be present as a fabric, especially a woven fabric and may comprise heat-shrinkable and/or heat-stable fibres. In a preferred embodiment the sleeve has circumferentially-extending heat-recoverable fibres and longitudinally-extending heat-stable fibres, preferably comprising polyethylene and glass respectively. Such a composite material is disclosed and claimed in EP 0116393 (Raychem) the disclosure of which is incorporated herein by reference.

The invention is further illustrated with reference to the accompanying drawings, in which: FIGS. 1 and 2 show prior art branch-off techniques;

Figure 1:
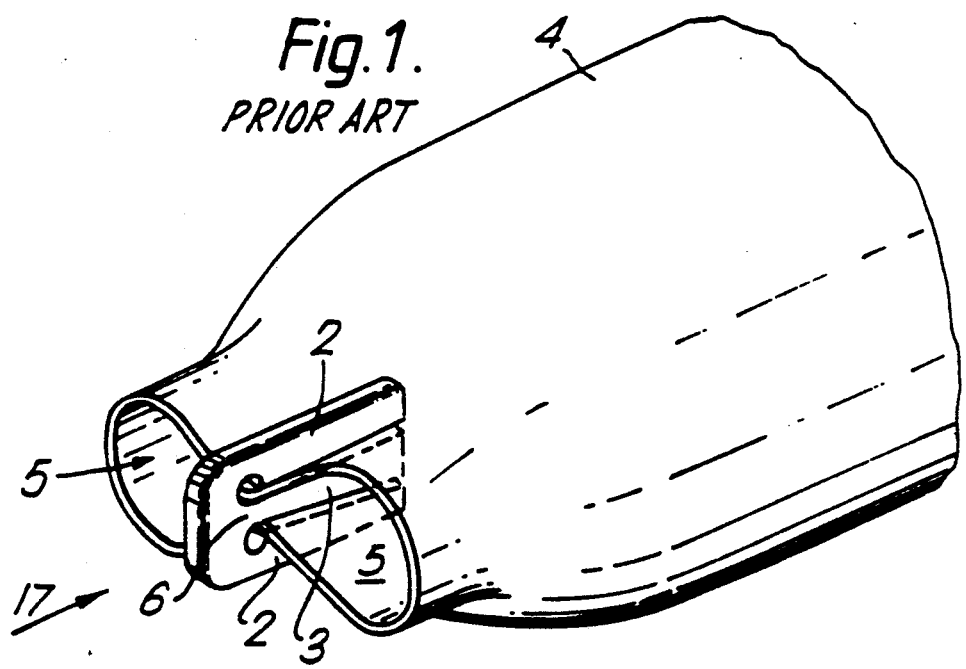

The prior art clip 1 of FIG. 1 has two outer legs 2 and a middle leg, and is positioned at an end of a heat-shrinkable sleeve 4 to form two terminal conduits 5. The clip causes deformation of the sleeve (which in the absence of the clip had a single, larger, terminal conduit) to bring together circumferentially-spaced portions thereof at a position 6. This design is disclosed in U.S. Pat. No. 4,400,579, mentioned above.

Figure 2:
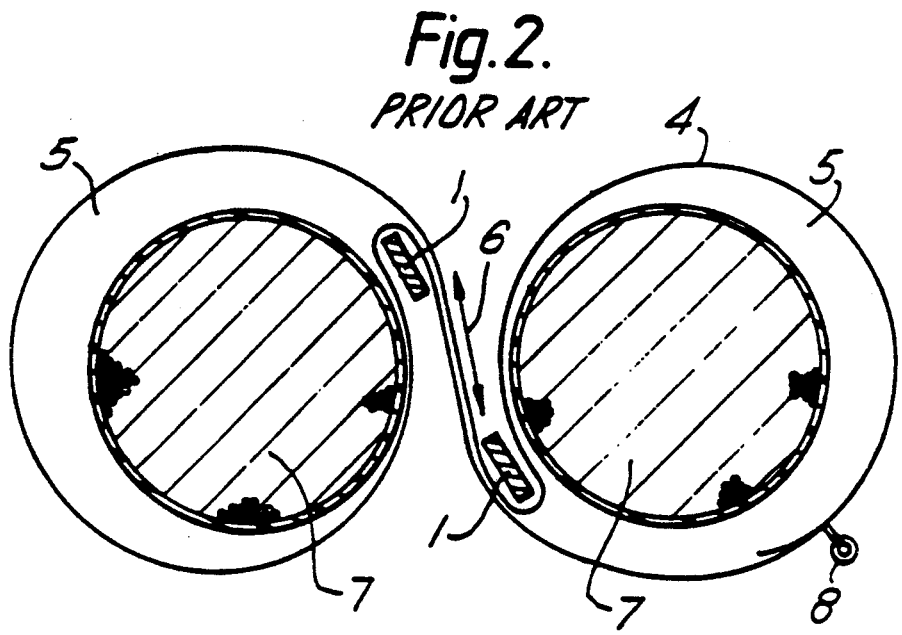

A different design of prior art clip, having the form of a fork, is shown in FIG. 2, which is a transverse cross-section at the end of a shrinkable sleeve 4 surrounding two multi-core telecommunications cables 7. The sleeve is a wrap-around sleeve, held in the wrapped-around configuration by a closure means 8. The clip or fork here has only two legs and opposing portions of the sleeve 4 at position 6 between fixed space-apart cables 7 are threaded through the legs, or prongs, of the clip 1. The two portions of the sleeve are thus held in contact with one another over a significant length 6. The sleeve is, of course, shown before shrinkage. This design is disclosed in GB 2019114, mentioned above.

Figure 3:
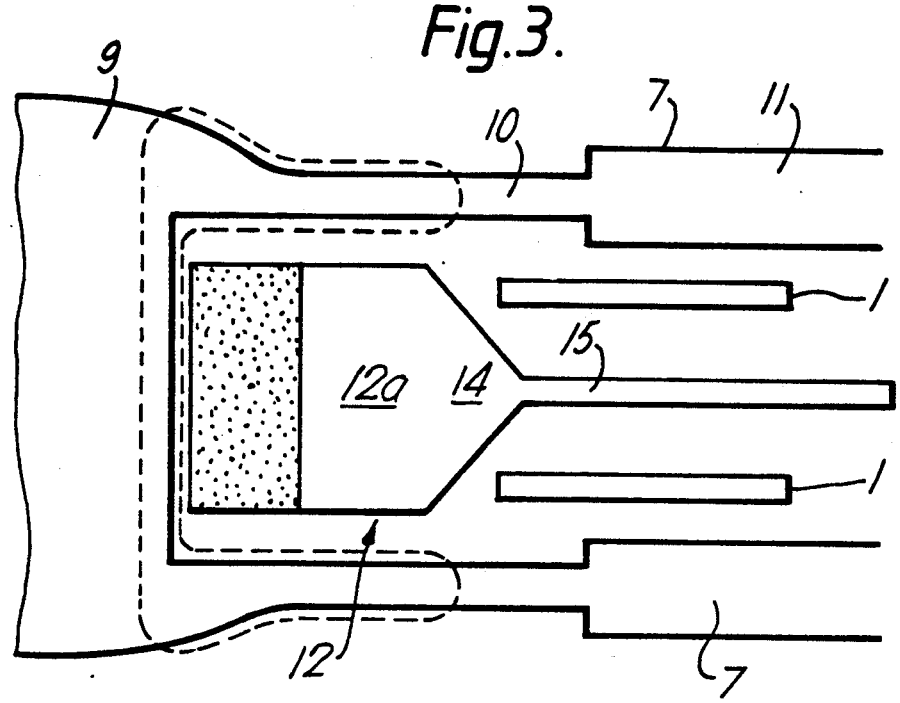
FIG. 3 is a diagrammatic plan representation of components used in a sealing method of the invention but with the heat-shrinkable sleeve omitted.

FIG. 3 is a plan view of an end of a cable splice case, showing positioning of two branch-off clips and a plug, as used in the invention, but the heat-shrinkable sleeve is omitted for clarity. Two cables 7 are spliced in a splice case 9, for example a lead splice in which the outlets 10 of the splice are spaced apart by a fixed distance. The incoming cables 7 are surrounded by one or more cable jackets 11. It is often desirable that the region of the lead splice shown surrounded by a dotted line be environmentally protected by a sealing material in addition to being surrounded by a sleeve. The sealing technique of FIG. 1 is likely to be unable to deal easily with the great and fixed separation between the outlets 10, and the technique of FIG. 2 whilst it can seal a surrounding sleeve at its extremity is not in general able to provide direct corrosion protection to the part of the splice case marked.

In the invention a plug 12 is provided between the cables and within the sleeve. The plug 12 is provided between the cables and within the sleeve. The plug 12 comprises a first portion 13 of larger cross-sectional size connected by a frusto-conical portion 14 to a second portion 15 of smaller cross-sectional size, the frusto-conical portion tapering towards the second portion.

Preferably the base of the frusco-conical portion is the same size and shape as those of the first portion, and its top is the same size and shape as those of the second portion so a smooth transition between first and second portions is provided. The first portion comprises a sealing material, such as a hot-melt adhesive, which is shown by stippling. If desired, the sealing material may be supplied separately, for example by wrapping it around the cable outlets 10. The plug may comprise a support member 12a, coated with a sealing material. The support member may be heat-conductive to aid activation of the sealing material. It is believed that the plug may serve to deliver the sealing material to the desired location and may act as a dam, as well as reducing the amount of sealing material required.

Figure 4:
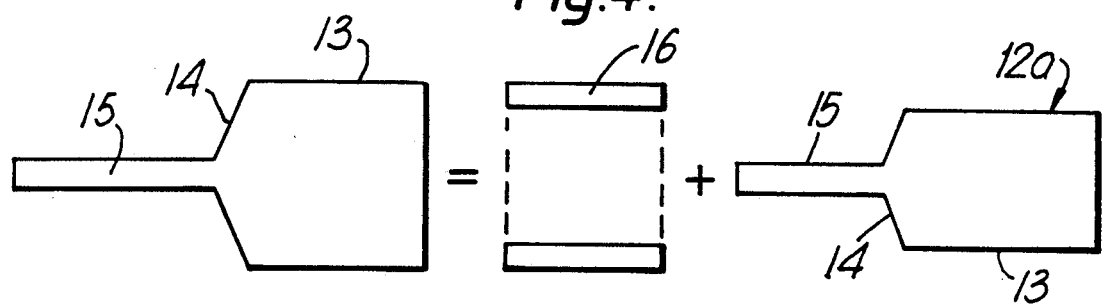
FIG. 4 shows a modular plug.

FIG. 4 shows a modular plug in which the part 16 can be added to a member 12a to give a plug having a first portion 13 of increased diameter. The part 16 may comprises an annulus of sealing material in which the unit 12a is a support member for the sealing material.

Figure 5:
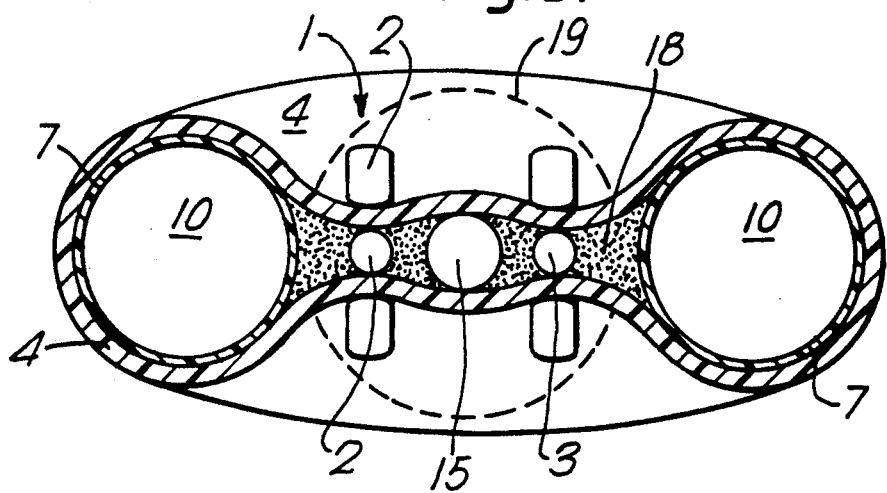
FIG. 5 is an end view of an installed splice case made by the method of the invention.

FIG. 5 shows an end view of a splice case, which would correspond to the view 17 of the prior art splice case of FIG. 1. Here two clips 1 are used, on each side of the plug, whose second portion 15 can be seen. The dotted line 19 shows the position of the first portion of the plug that is hidden within the sleeve 4. Any gaps between the cables and the sleeve etc may be filled by a sealing material 18, for example from an internal coating of the sleeve, from a middle leg 3 of the clips 1, and/or from the plug. Instead of two separate clips, a single clip may be used, for example incorporating two structures similar to the two clips illustrated.

We claim:

1. A method of forming a branch-off seal between a heat-shrinkable sleeve and at least two spaced-apart elongate substrates, which comprises the steps of:
    (a) positioning at least two spaced-apart elongate substrates within a heat-shrinkable sleeve;
    (b) positioning between the substrates and within the sleeve at an open end thereof a plug having a larger cross-sectional size at a first position away from said open end and a smaller cross-sectional size at a second position towards said open end;
    (c) positioning a heat-activatable sealing material at the first position;
    (d) forming shrinkable conduits in the sleeve by positioning one or more clips at the open end of the sleeve such that the substrates and the plug are in respective conduits; and
    (e) while the clip remains on the sleeve, applying heat so as to affect shrinkage of the sleeve to activate the sealing material, and form the desired seal.

2. A method according to claim 1, in which the plug comprises a support member having an adhesive tape wrapped around it at least at said first position, said adhesive tape providing at least part of said sealing material.

3. A method according to claim 1, in which three conduits are formed by a method which comprises positioning at least two clips, each having at least two elongate legs, at the open end of the sleeve, respective clips being positioned between the plug and a respective substrate wherein at least two legs of each clip are positioned externally of the sleeve.

4. A method according to claim 3, in which each of said clips has at least three legs, at least one leg comprising a heat activatable sealing material, said at least one leg being positioned internally of the sleeve.

5. A method according to claim 1, in which the plug or a support member thereof is of substantially uniform cross-sectional shape along a length thereof.

6. A method according to claim 1, in which the plug or a support member thereof is of substantially circular or substantially oval cross-section.

7. A method according to claim 1, in which the plug or a support member thereof comprises first and second substantially cylindrical portions interconnected by a substantially frusto-conical portion tapering towards the second portion, the first portion being of larger cross-sectional size than the second portion.

8. A method according to claim 1, in which the sleeve comprises a composite material.

9. A method according to claim 8, in which the composite material comprises a fibre-reinforced polymeric material.

10. A method according to claim 1, in which the substrates are spaced apart by a fixed distance.

11. A method according to claim 1, in which the substrates comprise cables.

12. A method according to claim 11, in which the substrates comprise a lead cable splice.

13. A kit of parts for carrying out a method of forming a branch-off seal between a heat-shrinkable sleeve and at least two spaced-apart elongate substrates, the kit which comprises:
    a heat-shrinkable sleeve;
    a plug having a larger cross-sectional size at a first portion away from an open end of the heat-shrinkable sleeve and a smaller cross-sectional size at a second portion towards the open end, said plug being adapted to fit between the spaced-apart elongate connectors; and
    a clip, said clip shaped and formed so as to remain on the sleeve during the application of heat so as to affect shrinkage of the sleeve to activate a sealant and to form a plurality of shrinkable conduits surrounding the substrates and the plug at the second position, to activate heat sealing material provided on at least the first portion of the plug and from the desired seal.

* * * * *